(12) United States Patent
Delaney et al.

(10) Patent No.: US 7,706,343 B2
(45) Date of Patent: *Apr. 27, 2010

(54) METHODS AND SYSTEMS FOR WIRELESS LOCAL AREA NETWORK (WLAN)-BASED SIGNALING NETWORK MONITORING

(75) Inventors: Robert J. Delaney, Raleigh, NC (US); Todd Eichler, Wake Forest, NC (US)

(73) Assignee: Tekelec, Morrisville, NC (US)

( * ) Notice: Subject to any disclaimer, the term of this patent is extended or adjusted under 35 U.S.C. 154(b) by 500 days.

This patent is subject to a terminal disclaimer.

(21) Appl. No.: 11/651,724

(22) Filed: Jan. 10, 2007

(65) Prior Publication Data

US 2007/0110018 A1    May 17, 2007

Related U.S. Application Data

(63) Continuation of application No. 10/937,930, filed on Sep. 10, 2004, now Pat. No. 7,286,516.

(51) Int. Cl.
H04W 4/00 (2006.01)

(52) U.S. Cl. .................. 370/338; 370/328; 455/517; 455/524; 455/525

(58) Field of Classification Search .......... 370/310–350
See application file for complete search history.

(56) References Cited

U.S. PATENT DOCUMENTS

| | | | |
|---|---|---|---|
| 5,966,431 A | 10/1999 | Reiman et al. | |
| 6,122,255 A | 9/2000 | Bartholomew et al. | |
| 6,680,922 B1 | 1/2004 | Jorgensen | |
| 6,738,821 B1 | 5/2004 | Wilson et al. | |
| 6,871,070 B2 | 3/2005 | Ejzak | |
| 6,882,692 B2 | 4/2005 | Somayazulu | |
| 7,142,852 B2 | 11/2006 | Tell et al. | |
| 7,286,516 B2 | 10/2007 | Delaney et al. | |
| 2001/0029182 A1 | 10/2001 | McCann et al. | |
| 2002/0085516 A1 | 7/2002 | Bridgelall | |
| 2002/0131400 A1 | 9/2002 | Tinsley et al. | |
| 2002/0191572 A1* | 12/2002 | Weinstein et al. | 370/338 |
| 2003/0120920 A1* | 6/2003 | Svensson | 380/270 |
| 2003/0133421 A1 | 7/2003 | Sundar et al. | |
| 2004/0114741 A1 | 6/2004 | Ngo et al. | |
| 2004/0258028 A1* | 12/2004 | Hossain et al. | 370/335 |
| 2005/0002407 A1 | 1/2005 | Shaheen et al. | |

(Continued)

OTHER PUBLICATIONS

Crowe, David. "SS7 & Wireless: Walking Into the Sunset?" -Telephony Apr. 15, 1999 <telephonyonline.com/wireless/mag/wireless_ss_wireless_walking/>.*

(Continued)

Primary Examiner—Kent Chang
Assistant Examiner—Kashif Siddiqui
(74) Attorney, Agent, or Firm—Jenkins, Wilson, Taylor & Hung, P.A.

(57) ABSTRACT

Methods and systems for WLAN-based signaling network monitoring are disclosed. A signaling message is received at a network routing node. A message copy function on the network routing node copies the signaling message. The message copy function forwards the copied signaling message to a WLAN interface. The WLAN interface transmits the signaling message to an external network monitoring platform via a wireless local area network connection.

41 Claims, 11 Drawing Sheets

U.S. PATENT DOCUMENTS

2005/0088999 A1 4/2005 Waylett et al.
2005/0111421 A1 5/2005 Delaney et al.
2005/0113067 A1* 5/2005 Marcovici et al. ........... 455/411
2006/0004643 A1 1/2006 Stadelmann et al.

OTHER PUBLICATIONS

Office Action for U.S. Appl. No. 10/993,089 (Sep. 18, 2008).
Interview Summary for U.S. Appl. No. 10/993,089 (Jul. 11, 2008).
Office Action for U.S. Appl. No. 10/993,089 (Dec. 27, 2007).
Interview Summary for U.S. Appl. No. 10/993,089 (Oct. 11, 2007).
Notice of Allowance and Fee(s) Due for U.S. Appl. No. 10/937,930 (Aug. 15, 2007).
Office Action for U.S. Appl. No. 10/937,930 (Feb. 8, 2007).
Interview Summary for U.S. Appl. No. 10/937,930 (Jan. 16, 2007).
Office Action for U.S. Appl. No. 10/937,930 (Aug. 9, 2006).
Office Action for U.S. Appl. No. 10/937,930 (Feb. 23, 2006).
Office Action for U.S. Appl. No. 10/937,930 (Jun. 1, 2005).
Office Action for U.S. Appl. No. 10/993,089 (Jul. 5, 2007).
International Search Report and Written Opinion of the International Searching Authority corresponding to PCT application No. PCT/US04/38826 (Jun. 21, 2006).
Non-Final Office Action for U.S. Appl. No. 10/993,089 (Jul. 23, 2009).
Notice of Panel Decision from Pre-Appeal Brief Review for U.S. Appl. No. 10/993,089 (May 11, 2009).
Notification of European Publication Number and Information on the Application of Article 67(3) EPC for European Application No. 04788686.6 (May 24, 2006).
Communication pursuant to Rules 109 and 110 EPC for European Application No. 04788686.6 (May 4, 2006).
Notification of Transmittal of the International Search Report and the Written Opinion of the International Searching Authority, or the Declaration for International Application No. PCT/US04/29606 (Oct. 6, 2005).

* cited by examiner

METHODS AND SYSTEMS FOR WIRELESS LOCAL AREA NETWORK (WLAN)-BASED SIGNALING NETWORK MONITORING

RELATED APPLICATIONS

This application is a continuation of U.S. patent application Ser. No. 10/937,930, filed Sep. 10, 2004, now U.S. Pat. No. 7,286,516, the disclosure of which is incorporated herein by reference in its entirety.

TECHNICAL FIELD

The present invention relates to signaling network monitoring systems. More particularly, the present invention relates to methods and systems for WLAN-based signaling network monitoring.

BACKGROUND

Figure 1:
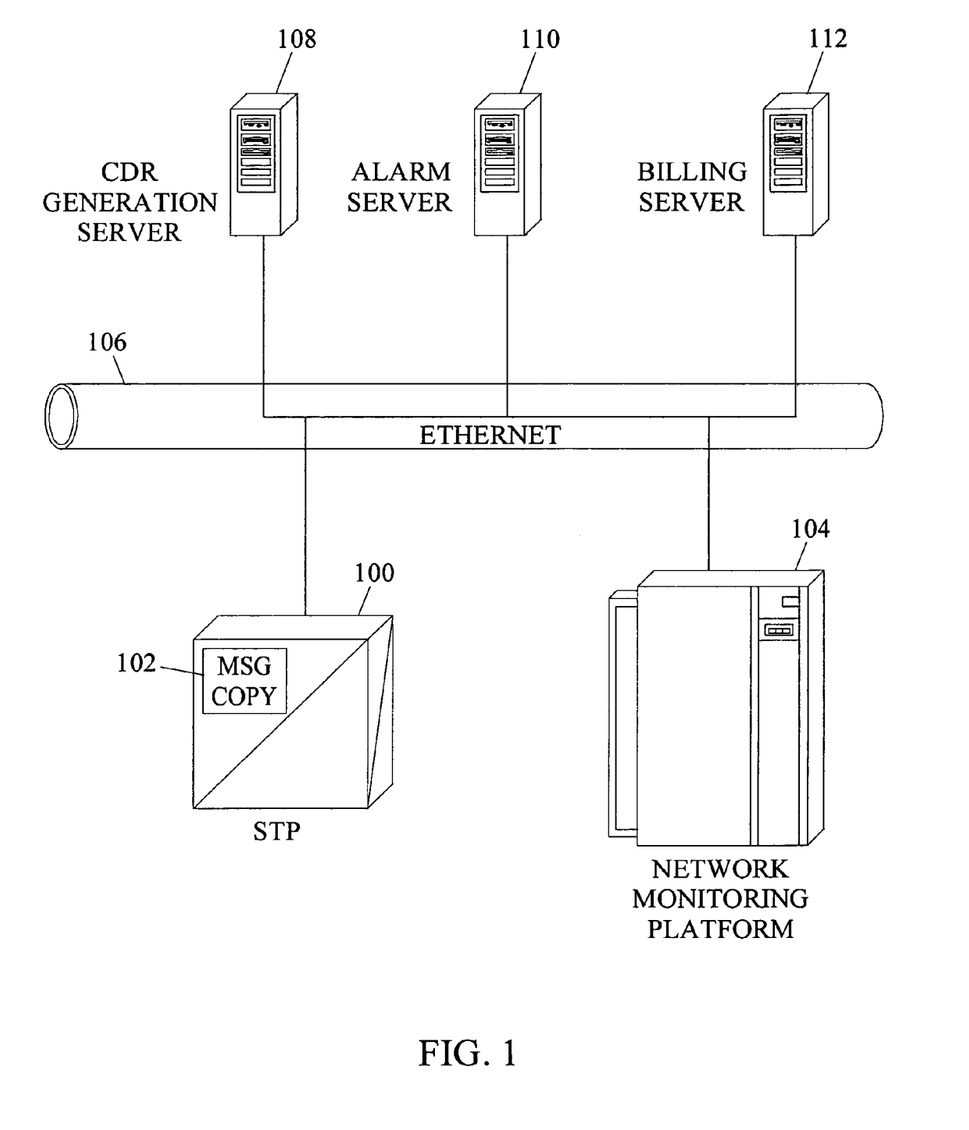
FIG. 1 is a block diagram of a conventional network monitoring system.

Signaling network monitoring systems are commonly used to capture signaling message data from nodes in a telecommunications network. Some network monitoring systems are implemented as cards or circuit boards that plug into the nodes that they monitor. Other systems include signaling link probes that copy signaling messages from SS7 signaling links. Still other network monitoring systems use a combination of internal and external message copy functions. FIG. 1 illustrates a conventional signaling network monitoring system that signaling message copy functionality within a signaling message routing node, such as a signal transfer point. In FIG. 1, STP 100 includes an internal MSU copy function 102 that copies messages from SS7 signaling links. MSU copy function 102 copies signaling messages sent or received on SS7 signaling links and forwards them to network monitoring processors 104 via wired Ethernet 106. Network monitoring platform 104 stores and forwards the signaling message copies to one or more servers 108, 110, and 112. In the illustrated example, server 108 receives MSUs and formats the MSUs into CDRs and TDRs, as required by other applications. Server 110 may generate alarms based on security events detected from CDRs received from server 108. Server 112 may generate bills based on CDRs generated by server 108.

One problem with the system illustrated in FIG. 1 is that wired connections are required between MSU copy function 102, network monitoring platform 104, and servers 108, 110, and 112. Requiring wired connections between telecommunications network monitoring components is undesirable because installing physical wires in existing telecommunications facilities increases the time and expense required to provide network monitoring systems.

Another problem with conventional wire-based network monitoring systems that reside within a telecommunications network element is that such systems require a network interface card (NIC) in the telecommunications network element frame for every predetermined number of link cards being monitored. In the example illustrated in FIG. 1, STP 100 may include many link interface modules, depending on the number of SS7 or IP signaling links that it serves. Each link interface module may include its own MSU copy function implemented in software on the link interface module. However, in order to connect to Ethernet 106, STP 100 includes a network monitoring transport card for every n link interface modules, where n is an integer that depends on the speeds of the links being monitored relative to the speed of the network monitoring LAN and the processing and storage capacity of the network monitoring transport card. As the number of link interface modules increases, the number of network monitoring transport cards must also increase. As a result, the design illustrated in FIG. 1 is not scalable.

Accordingly, in light of these difficulties associated with conventional network monitoring systems, there exists a need for improved methods and systems for transporting signaling message copies to a location where they can be processed.

SUMMARY

The present invention includes methods and systems for WLAN-based signaling network monitoring. According to one aspect of the invention, signaling messages are received at a signaling message routing node, such as a signal transfer point. The signaling messages are copied and transmitted over a wireless local area network connection to a network monitoring platform. In one exemplary implementation, each link interface module may include a WLAN interface for transmitting the signaling message copies to the network monitoring platform over a WLAN. The network monitoring platform receives the signaling message copies sent over the WLAN and stores the signaling message copies. The network monitoring platform may be accessible by various network monitoring applications via the WLAN. The network monitoring applications may obtain the message copies over the WLAN. Once the copies are received, the network monitoring applications may perform their various network monitoring functions, such as CDR generation, billing, fraud detection, etc. Providing network monitoring over a wireless local area network interface decreases the need for external wiring and reduces scalability problems associated with the network monitoring systems in conventional signaling message routing platforms. By providing a WLAN interface on each link interface module, there is no longer a need for a NIC card dedicated to routing signaling message copies to an external platform.

Accordingly, it is an object of the invention to provide methods and systems for providing network monitoring functions at a signaling message routing node using a wireless local area network interface.

It is another object of the invention to provide a signaling message routing node with integrated MSU copying capabilities and improved scalability.

Some of the objects of the invention having been stated hereinabove, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION

Figure 2:
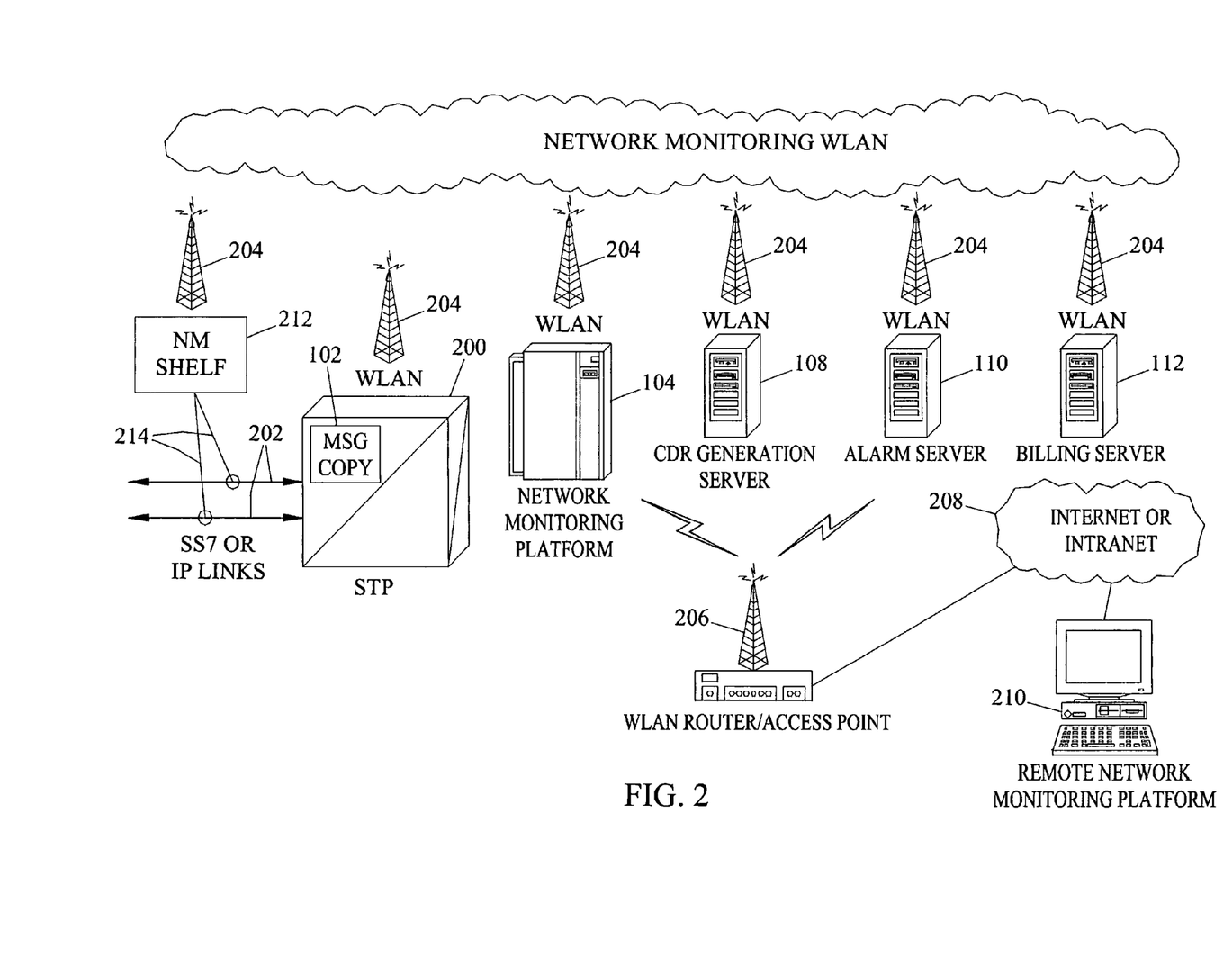
FIG. 2 is a block diagram of a WLAN-based signaling network monitoring system according to an embodiment of the present invention.

In one exemplary implementation, components of a network monitoring system may be connected by a WLAN. FIG. 2 illustrates a network monitoring system for copying signaling messages sent or received by a signal transfer point and communicating the signaling message copies to network monitoring applications via a WLAN. Referring to FIG. 2, signal transfer point 200 may be configured to route SS7 signaling messages over SS7 or IP links 202. STP 200 may also include an MSU copy function 102 as described above with regard to FIG. 1. However, rather than including an Ethernet NIC card for communicating message copies to network monitoring applications 108, 110, and 112, STP 200 may include a WLAN interface 204 for communicating the MSUs copied from the SS7 or IP links 202 to downstream network monitoring applications. Accordingly, network monitoring platform 104 and network monitoring applications 108, 110, and 112 may also include a WLAN interface 204 for communicating with STP 200 via its WLAN interface. A WLAN router/access point 206 may route signaling messages between network monitoring platform 104 and the various other components of the network monitoring system. In addition, WLAN routers/access point 206 may provide remote access to the network monitoring WLAN via Internet or Intranet 208. A remote network monitoring platform 210 may thus be capable of accessing any of the applications in the network monitoring WLAN.

In addition to or instead of signaling message copy functions that are internal to a network node, the system illustrated in FIG. 2 may include an external network monitoring shelf 212 that copies SS7 or IP signaling messages from SS7 or IP links 202 using link probes 214. Network monitoring shelf 212 may also include a WLAN interface 204. An exemplary network monitoring shelf suitable for use with embodiments of the present invention is the TekServer Platform available from Tekelec of Calabasas, Calif.

In one exemplary implementation, WLAN interfaces 204 and message copy functions 102 in STP 200 may be located on signaling link interface cards within STP 200. By providing WLAN transport capabilities on the link interface cards, there is no longer a need for a NIC card dedicated to routing message copies to an external network monitoring platform. As a result, the scalability problem associated with conventional network monitoring systems that require internal NIC cards for each predetermined number of link interface cards is reduced.

Figure 3:
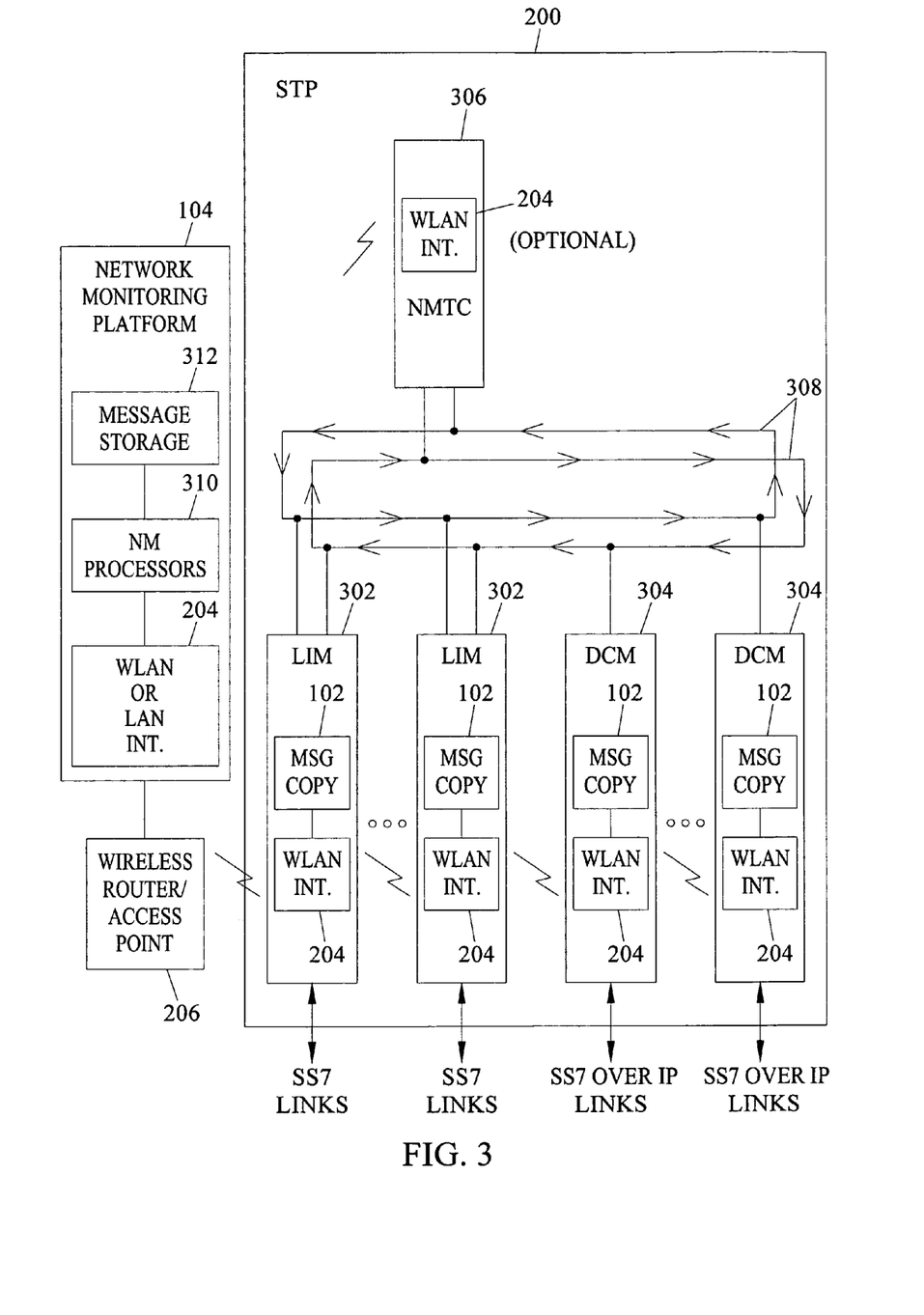
FIG. 3 is a block diagram of an STP with an integrated WLAN-based network monitoring system according to an embodiment of the present invention.

FIG. 3 illustrates an exemplary internal architecture for signal transfer point 200 and network monitoring platform 104 according to an embodiment of the present invention. Referring to FIG. 3, signal transfer point 200 includes a plurality of link interface modules (LIMs) 302 for sending and receiving SS7 messages over SS7 signaling links. STP 200 also includes a plurality of data communications modules (DCMs) 304 for sending and receiving SS7 signaling messages over IP signaling links. STP 200 may also optionally include one or more network monitoring transport cards 306. Network monitoring transport card 306 may communicate copied signaling messages from STP 200 to an external network monitoring platform. LIMs 302, DCMs 304, and NMTC 306 are connected to each other via a counter-rotating, dual-ring bus 308.

In the illustrated example, LIMs 302, DCMs 304, and optional NMTC 306 each include a WLAN interface 204 for communicating copied signaling messages to external network monitoring platform 104. External network monitoring platform 104 may also include a wireless local area network interface 204 for receiving messages transmitted from wireless local area network interfaces 204 from within STP 200. Alternatively, network monitoring platform 104 may include a LAN interface for receiving the message copies from an external WLAN device that communicates directly with WLAN interfaces 204 within STP 200. For example, wireless router/access point 206 may be connected to network monitoring platform 104 via a LAN or a WLAN interface to route signaling messages and network monitoring control messages between WLAN interfaces 204 within STP 200 and network monitoring platform 104.

Network monitoring platform also includes a plurality of network monitoring processors 310 for managing network monitoring connections with message copy functions 102 and message storage 312 for storing the message copies. Network monitoring processors 310 may implement a SCTP/IP, TCP/IP and/or UDP/IP protocol stack for receiving the message copies from message copy functions 102. In addition, network monitoring processors 310 may implement a network monitoring transport protocol, which will be described in detail below. Message storage 312 comprises memory for storing received messages being monitored.

LIMs 302 and DCMs 304 may each include a message copy function 102 that copies signaling messages. Once a LIM or DCM has copied signaling messages to be transmitted to network monitoring platform 104, that LIM requests network monitoring service from network monitoring platform 104 by sending a request via UDP broadcast to network monitoring platform 104. The processor on network monitoring platform 104 provisioned to handle message copies from the particular LIM responds to the request, and a TCP/IP or SCTP/IP connection may be set up between the requesting LIM and the responding processor in platform 104. Communication between network monitoring platform 104 and the requesting LIM or DCM may occur directly using their respective WLAN interfaces without the need for a dedicated network monitoring NIC card within STP 200.

Wireless router/access point 206 may be any suitable type of router with a wireless local area network interface and IP forwarding functions. Exemplary wireless routers suitable for use with embodiments of the present invention include any of the 802.11x, 802.16x, or 802.20x wireless routers available from Netgear, Inc. or Cisco Systems, Inc. Wireless router/access point 206 may be connected to network monitoring platform 104 via a wireless interface or a wireline interface, such as a 100-base-T Ethernet interface. In an alternate implementation, wireless route/access point 206 may be integrated within network monitoring platform 104. Using an internal or a stand-alone wireless router is intended to be within the scope of the invention.

As mentioned above, in the embodiment illustrated in FIG. 3, network monitoring transport card 306 is optional, because LIMs 302 and DCMs 304 include there own wireless local area network interfaces 204. The need for separate network monitoring transport cards is reduced. As a result, the scalability problem associated with conventional signal transfer points that require separate network monitoring transport cards is eliminated. However, if LIMs 302 and DCMs 304 do not include wireless local area network interfaces, network monitoring transport cards 306 may include such interfaces to eliminate external wireline connections to network monitoring platform 104. Thus, STPs with wireless local area network interfaces located on the link interface modules and/or on network monitoring transport cards are intended to be within the scope of the invention.

Figure 4:
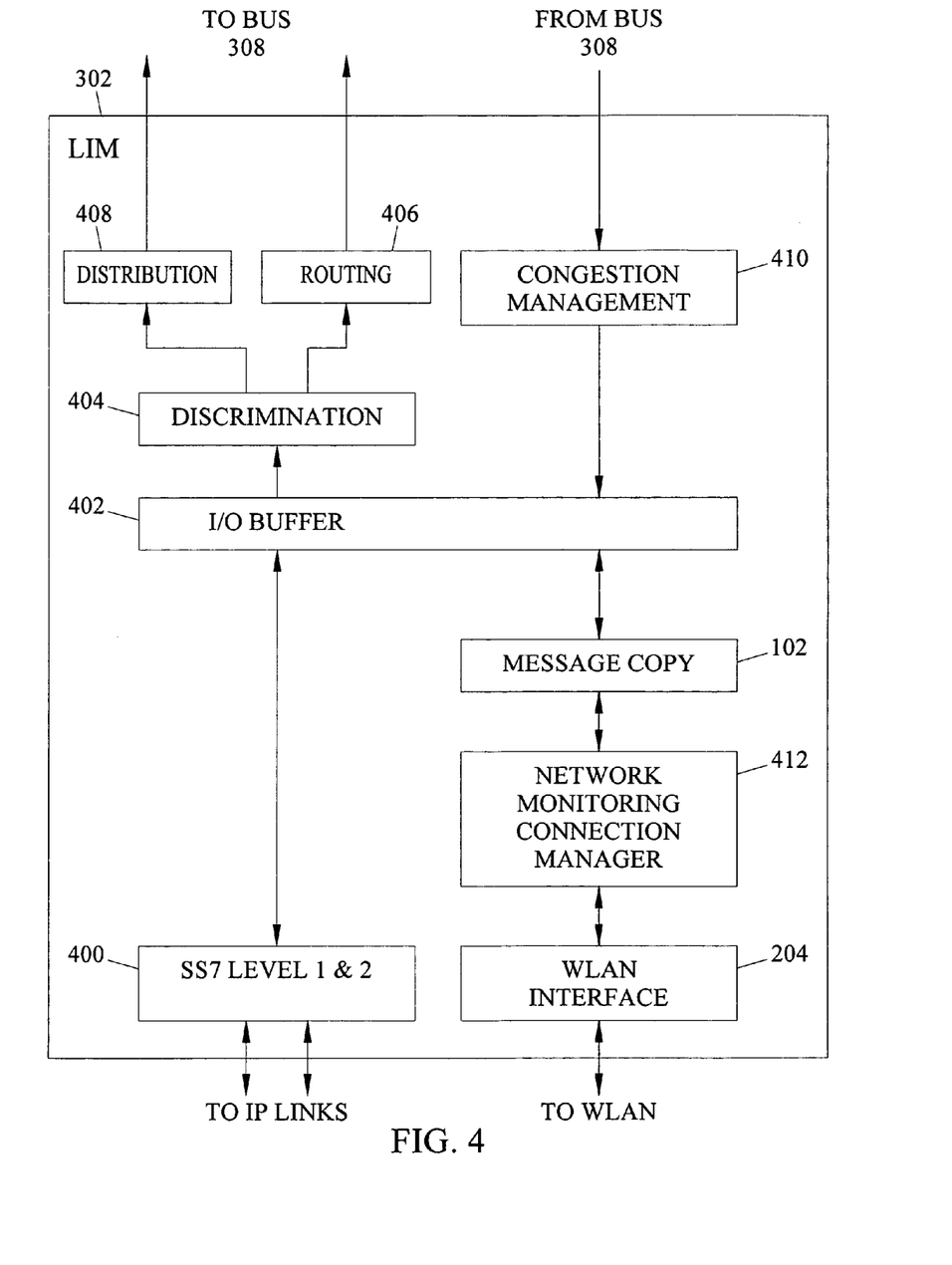
FIG. 4 is a block diagram of a link interface module including a WLAN interface for network monitoring connections according to an embodiment of the present invention.

FIG. 4 is a block diagram illustrating an exemplary LIM card 302 having a WLAN interface 204. Referring to FIG. 4, LIM card 302 includes an SS7 level 1 and 2 function for performing error detection, error correction, and sequencing for sending and receiving SS7 messages over SS7 signaling links. An input/output buffer 402 stores incoming and outgoing signaling messages before being either sent over the signaling links or processed by higher layers. A discrimination function 404 receives incoming SS7 signaling messages and determines whether the signaling messages require processing by STP 200 or whether the messages are destined for an external node. For messages destined for an external node, discrimination function 404 forwards the messages to routing function 406. Routing function 406 routes the signaling messages based on MTP layer 3 information in the signaling messages to the card or module associated with the outbound signaling link. For messages destined for STP 200, discrimination function 404 forwards these messages to distribution function 408. Distribution function 408 forwards these messages to the appropriate processing module within STP 200 for further processing.

For outbound messages, LIM 302 includes a congestion management function 410 for receiving messages from bus 308 and performing SS7 congestion management procedures. These procedures may include determining whether an outbound link is congested and only sending signaling messages over the link if the priority of the messages is greater than the current congestion level. Congestion management function 410 forwards outbound messages that are to be transmitted over the outbound signaling link to I/O buffer 402. SS7 level 1 and 2 functions 400 then insert the appropriate SS7 level 1 and 2 header information in the messages and forward the messages over the outbound signaling link.

Message copy function 102 copies both inbound and outbound messages from I/O buffer 402. Message copy function 102 also requests service from the one of the processors in network monitoring platform 104 when message copy function 102 has message copies to send. Requesting service may include broadcasting a service request via UDP to network monitoring platform 102. One of the network monitoring processors in platform 104 may respond to the service request via a service acceptance message. Once the network monitoring service request has been accepted, the requesting message copy function 102 encapsulates copied signaling messages in a network monitoring packet that includes a header identifying the signaling link on which the message was received and a payload that carries the signaling message copy or copies. This network monitoring protocol for transmitting signaling messages from a message copy function to a network monitoring processor is described in further detail in commonly-assigned, co-pending U.S. patent application Ser. No. 10/154,309 filed May 23, 2002, the disclosure of which is incorporated herein by reference in its entirety.

In embodiments in which STP 200 includes a dedicated NIC card for communicating message copies to network monitoring platform 104, message copy function 102 may simply forward the messages to the network monitoring platform and WLAN interface 204 on LIM card 302 may be omitted. In the illustrated embodiment, it is assumed that a centralized NIC card is not present and that network monitoring connection manager 410 implements TCP/IP, UDP/IP, or suitable transport and network layer protocol for delivering message copies directly to network monitoring platform 104. WLAN interface 204 implements layers 1 and 2 of a WLAN protocol for delivering the messages to network monitoring platform 104 via a WLAN.

Figure 5:
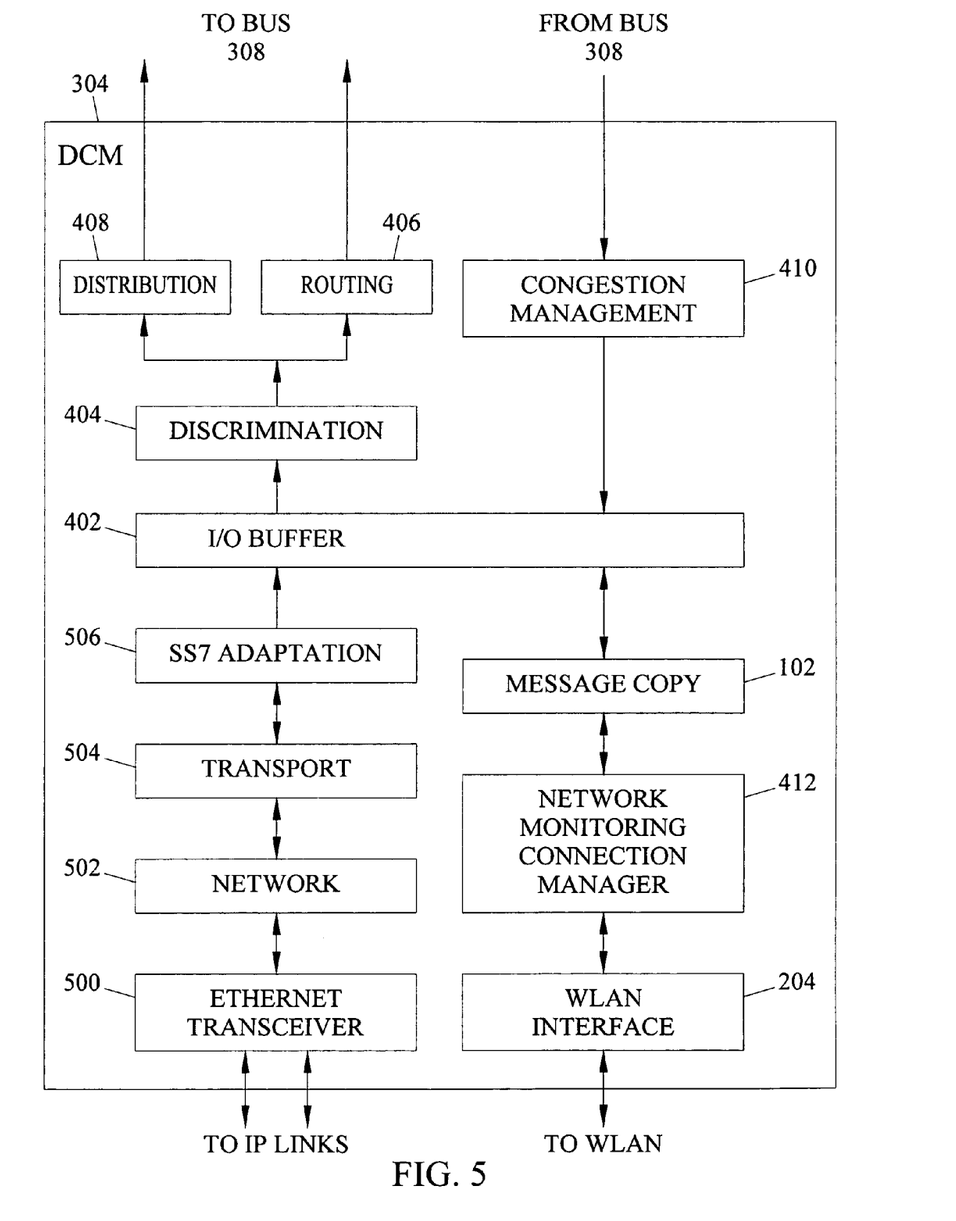
FIG. 5 is a block diagram of a data communications module including a WLAN interface for network monitoring connections according to an embodiment of the present invention.

FIG. 5 is a block diagram illustrating an exemplary DCM card including a WLAN interface according to an embodiment of the present invention. Referring to FIG. 5, DCM card includes an Ethernet interface 500 for sending and receiving signaling messages over IP links using the Ethernet protocol. Network layer 502 implements network layer functions, such as packet forwarding and routing. Network layer 502 may be implemented using Internet protocol. Transport layer 504 manages associations or connections with other signaling nodes. Transport layer 504 may be implemented using the stream control transmission protocol (SCTP) or transmission control protocol (TCP). SS7 adaptation layer 506 includes functionality for sending and receiving SS7 signaling messages over IP signaling links. SS7 adaptation layer 506 may be implemented using TALI, M3UA, M2PA, SUA, as described in the correspondingly-named IETF Internet drafts and RFCs, or any other suitable SS7 adaptation layer protocol. I/O buffer 402, discrimination function 404, routing function 406, distribution function 408, and congestion management function 410 perform the same functions as their counterparts on LIM card 302. Hence, a description thereof will not be repeated herein.

Similarly, DCM 304 includes message copy function 102 for copying inbound and outbound signaling messages from I/O buffer 402 and for requesting network monitoring service from platform 104. Network monitoring connection manager 412 implements the transport and network layers of the network monitoring protocol stack used to deliver the message copies to platform 104. WLAN interface 204 communicates the message copies to platform 104 via a WLAN.

Figure 6:
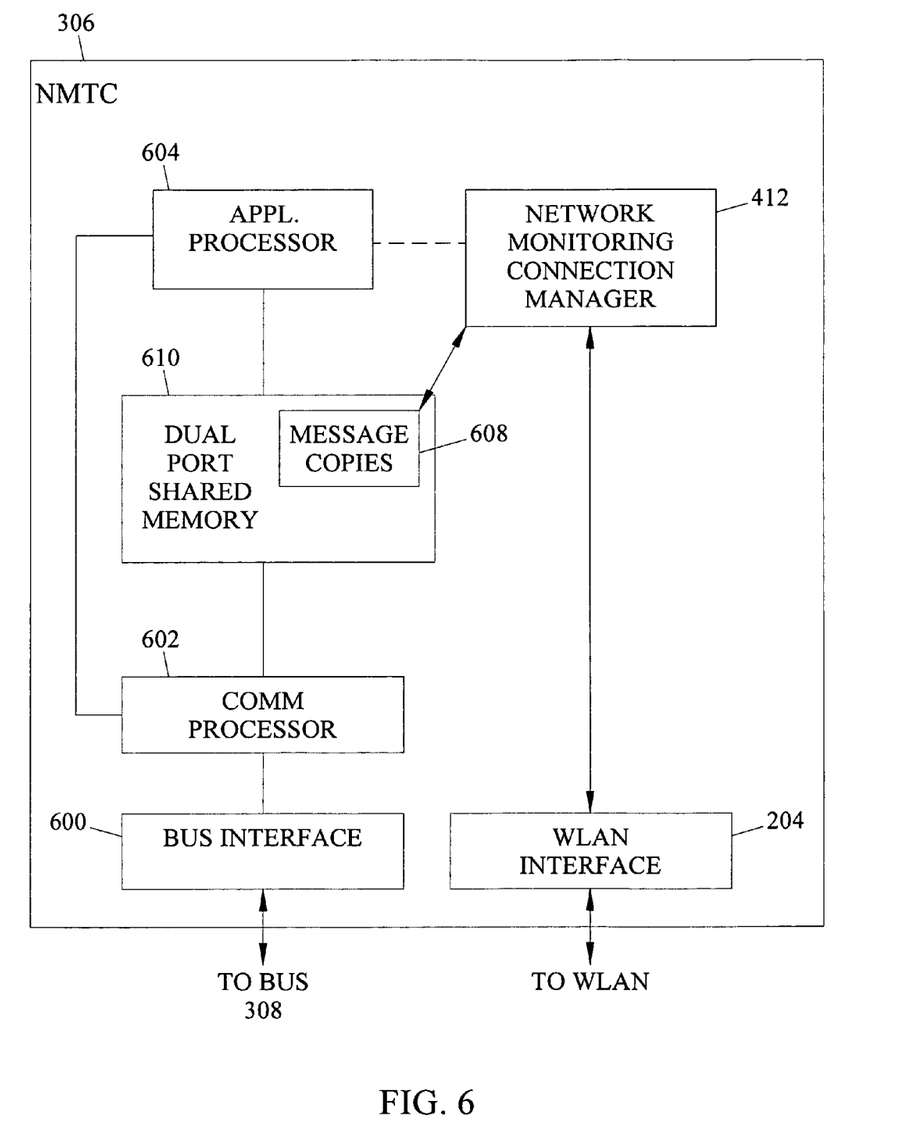
FIG. 6 is a block diagram of a network monitoring transport card including a WLAN interface according to an embodiment of the present invention.

In embodiments in which each LIM and DCM card does not include a WLAN interface, WLAN interface 204 and network monitoring connection manager 412 may be located on network monitoring transport card 306. Although this embodiment is less scalable, it nonetheless eliminates the need for external network monitoring cables. FIG. 6 illustrates an exemplary architecture for a network monitoring transport card including a WLAN interface according to an embodiment of the present invention. Referring to FIG. 6, network monitoring transport card 306 includes a bus interface 600 for sending and receiving messages via bus 308. A communications processor 602 controls communications over bus 308. Application processor 604 runs network monitoring applications, such as network monitoring connection manager 412. Network monitoring connection manager 412 implements the network and transport layers of the protocol stack for communicating message copies to network monitoring platform 104.

In operation, network monitoring transport card 306 receives messages copied from the link interface module via bus 600. Communications processor 602 forwards the messages to application processor 604. Application processor 604 stores message copies 608 in memory. Network monitoring connection manager 412 forwards the messages to network monitoring platform 104 via WLAN interface 204. Thus, even in the centralized implementation, network monitoring transport card 306 reduces the need for wired network monitoring connections at a signaling message routing node. However, this embodiment is less scalable in the embodiment described above where each interface module includes its own WLAN interface 204.

802.11 Criteria

In one exemplary implementation, WLAN interfaces 204 may implement one of the 802.11 family of protocols. In such implementation, each WLAN interface may conform to an established 802.11 network topology known as Infrastructure where each device in the basic service set, BSS, will communicate to the access point, i.e., the control unit, and the access point will communicate with each node in the network, i.e. servers, and/or the outside world, i.e., a user's workstation. This type of network allows for maximum configurations and flexibility and will allow a high degree of integrity by allowing the access point to control ingress to the network. Thus, in the exemplary WLAN illustrated in FIG. 2, message copies may be communicated among the various nodes using WLAN router/access point 206.

The 802.11 protocol specification provides a number of MAC layer and higher methods of security, Wireless Equivalent Privacy, WEP, being one that also provides the feature shared access key that allows only authorized stations access to the network. Encryption is also provided via the WEP protocol so data transmitted from network monitoring 104 platform to an application server can be encrypted as well. Thus, the nodes illustrated in FIG. 2 may utilize WEP authentication and encryption to securely communicate copied signaling messages over the WLAN.

802.11 Interface

Figure 7:
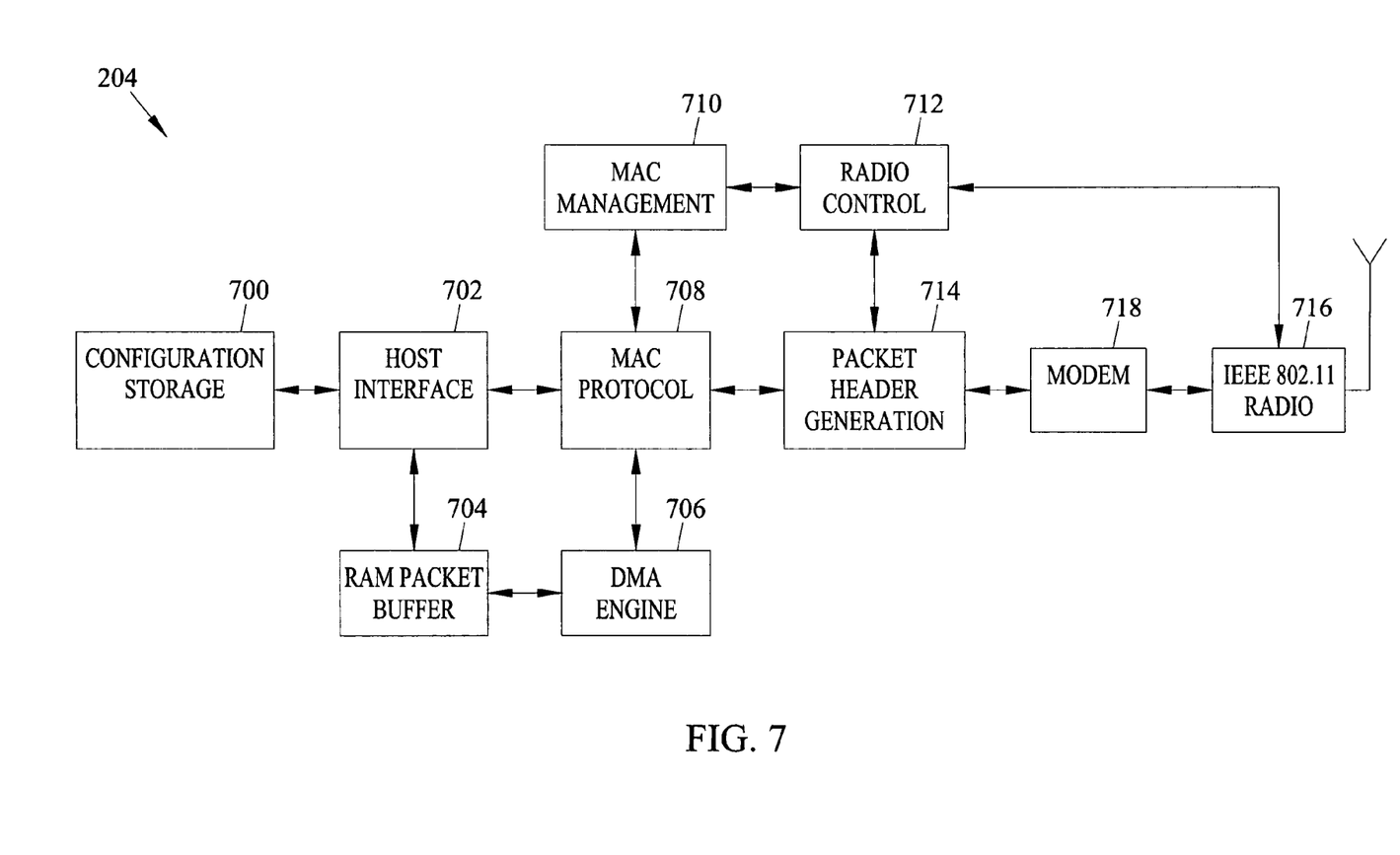
FIG. 7 is a block diagram for an 802.11 interface suitable for use with embodiments of the present invention.

In some new microprocessor implementations, the 802.11 interface is an on-chip component of a microprocessor. For example, some of the Pentium® family of microprocessors available from Intel Corporation include an interface referred to as the Centrino® interface. The Centrino® interface is an 802.11b transceiver. FIG. 7 is a block diagram an embedded 802.11 interface suitable for use with embodiments of the present invention. A microprocessor with an embedded 802.11 interface may be used on any of the LIMs, DCMs, and/or NMTC cards illustrated in FIG. 3 to communicate signaling messages to a network monitoring platform over a wireless interface. Alternatively, WLAN interfaces 204 may be implemented using a stand-alone WLAN chipset.

FIG. 7 is a block diagram of an exemplary 802.11 network interface suitable for use as WLAN interface 204. Referring to FIG. 7, WLAN interface 204 includes configuration storage 700 for storing WLAN interface configuration information, such as the MAC address and version used by the interface. Host interface 702 interfaces with the host processor, such as the application processor on LIMs 302 and DCM 304. RAM packet buffer 704 stores packets received from the radio interface and packets to be sent to the radio interface. For example, RAM packet buffer 704 may buffer MSU copies to be transmitted to network monitoring platform 704. DMA engine 706 allows processors to directly access packets stored in packet buffer memory 704. MAC protocol block 708 performs MAC layer functions, such as carrier sense multiple access with collision detect and collision avoidance. For example, MAC protocol block 708 may repeatedly send a test message, referred to as a ready to send (RTS) message, before sending any MSU copies to network monitoring platform 104. If network monitoring platform 104 returns a clear to send message, then MAC protocol block 708 may begin transmission of message copies. If a clear to send message is not received, MAC protocol block 708 may wait a predetermined time period before retrying the ready to send message. Any other devices that detect the clear to send will recognize that another device is transmitting and will allow that signal to leave uncontested.

MAC management block 710 manages overall MAC protocol operations. Packet header generation block 712 generates packet headers for MAC frames. Radio control block 714 controls the sending and receiving of packets via radio interface 714. Modem 716 modulates a carrier with the packet data to be sent using any suitable modulation scheme. If 802.11 is implemented, modem 716 may implement orthogonal frequency division multiplexing. The operating frequency implemented by radio interface 714 may be any suitable free frequency. If 802.11b is implemented, the operating frequency is 2.4 GHz. If 802.11a is implemented, the frequency range may be any frequency between 5.15 and 5.825 GHz.

Figure 8:
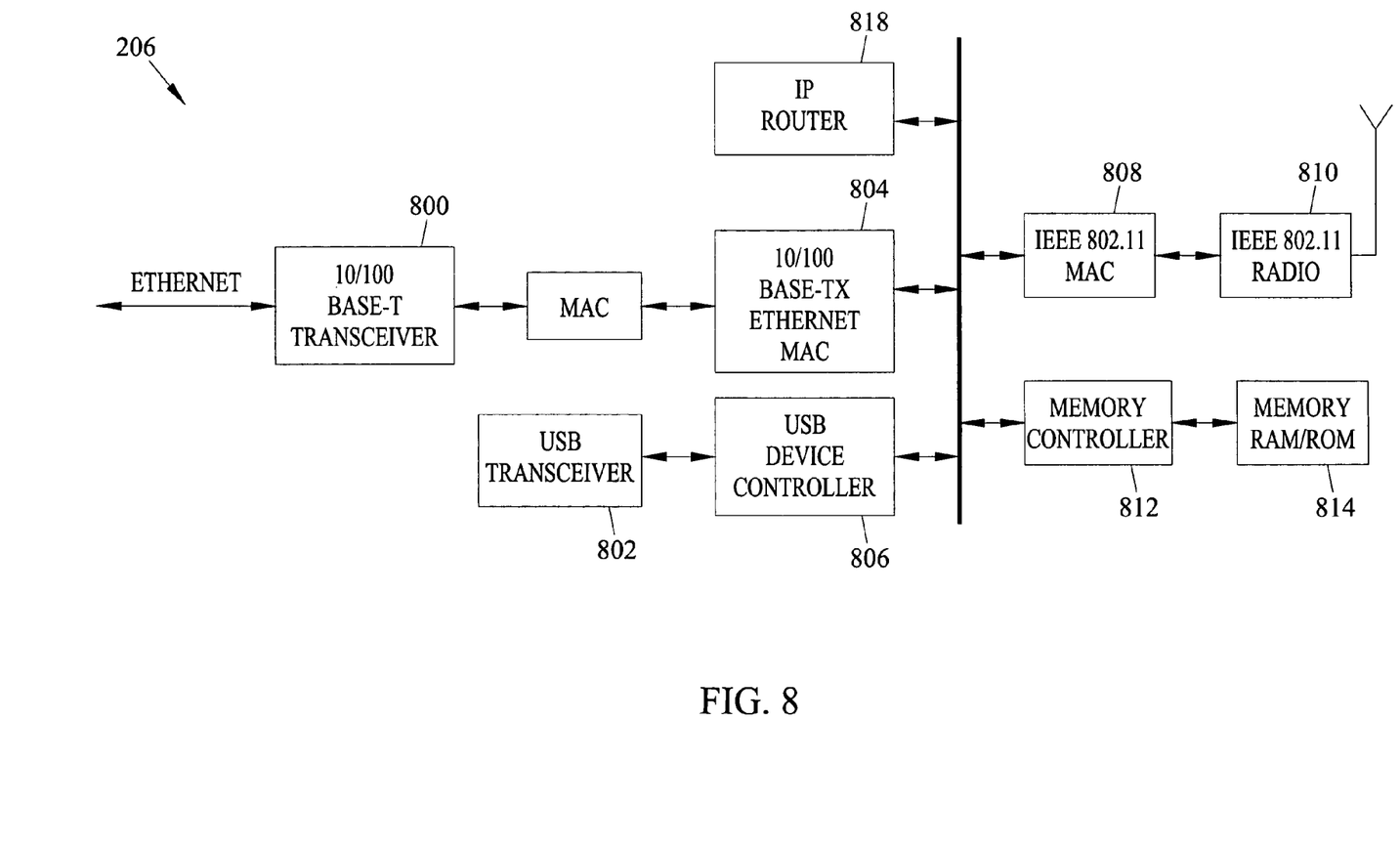
FIG. 8 is a block diagram of an 802.11 access point suitable for use with embodiments of the present invention.

As stated above, wireless router/access point 206 may include a WLAN interface for sending and receiving signaling messages and a wired Ethernet interface for communicating signaling message copies to network monitoring platform 104. In the 802.11 standard, the interface that converts from the WLAN protocol to a wired LAN protocol is referred to as an access point. FIG. 8 is a block diagram of an exemplary access point circuit suitable for use with embodiments of the present invention. Referring to FIG. 8, wireless router/access point 206 includes an Ethernet transceiver 800 for communicating with network monitoring platform 104 via a wired Ethernet connection. Wireless router/access point 206 may also include a USB transceiver 802 for communicating with network monitoring platform 104 via a USB interface. Ethernet MAC block 804 implements 10/100-base-T Ethernet MAC layer functions. Similarly, USB device controller 806 controls USB transceiver and sends and receives messages via the USB interface.

On the radio side, access point may include an 802.11 MAC block 808 that performs 802.11 MAC functions and 802.11 transceiver 810 that sends and receives signaling messages via an 802.11 interface. Memory controller 812 controls access to memory 814. For example, memory controller 812 may allow reads and writes of signaling messages to memory 814. Wireless router/access point 206 may include an IP router 818 for routing signaling message copies among the various nodes illustrated in FIG. 2 via the LAN or the WLAN interface.

Figure 9:
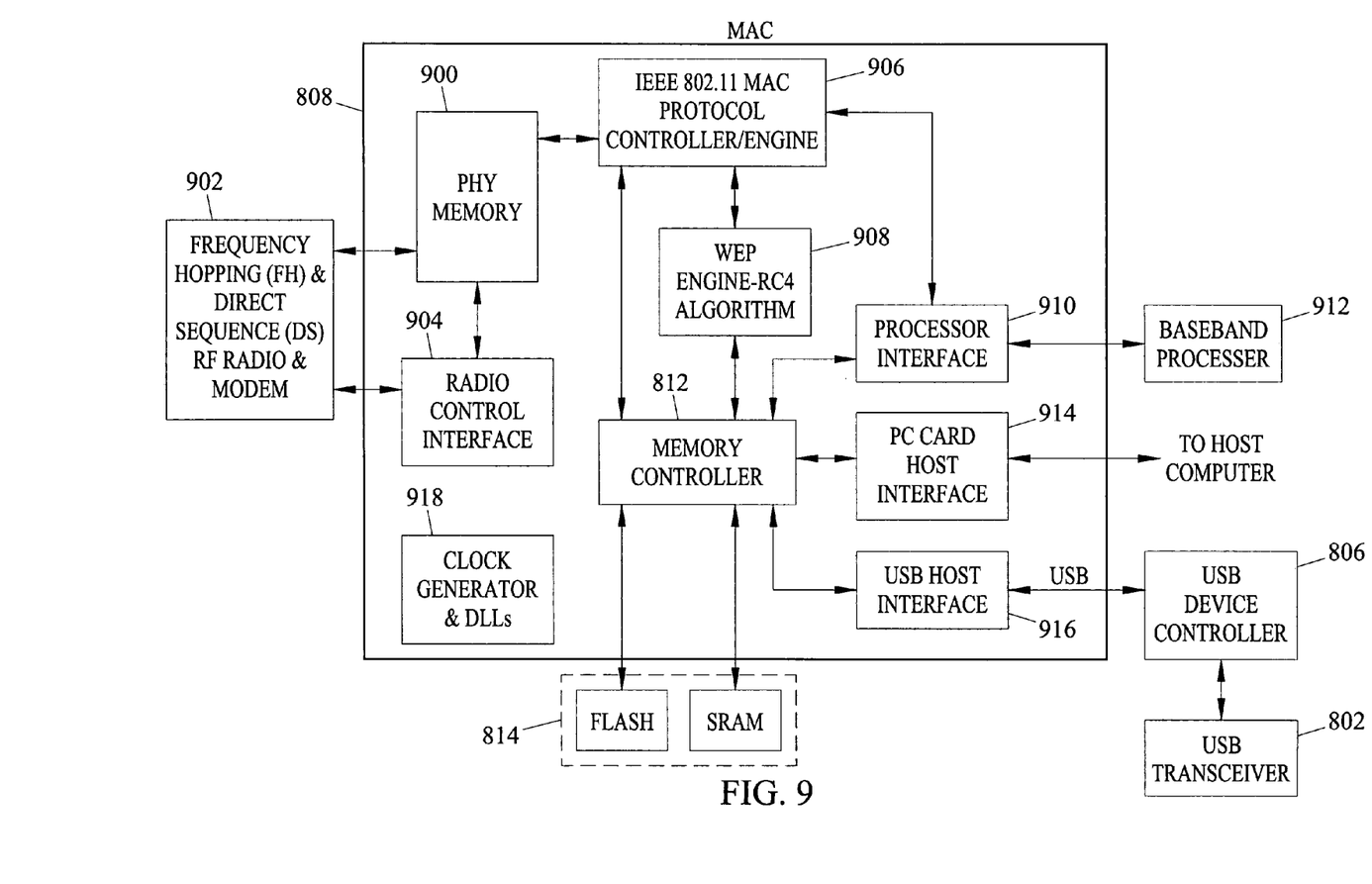
FIG. 9 is a MAC layer block diagram of an 802.11 interface suitable for use with embodiments of the present invention.

FIG. 9 is a block diagram illustrating 802.11 MAC layer 808 in more detail. Referring to FIG. 9, MAC layer 808 includes a physical layer interface 900 for sending a bit stream to modem 902. Radio control interface 904 controls frequency hopping and direct sequence spread spectrum communications via radio interface 902. MAC protocol controller 906 controls the overall operation of MAC block 808. WEP engine/RC4 algorithm 908 performs encryption and authentication for secure communications over the WLAN.

Processing interface 910 provides an external control interface to processor 912. Processor 912 may be the host system processor. In embodiments of the present invention, processor 912 may be a processor of network monitoring platform 104 or of STP 200. PC card and host interface 914 allows MAC block 908 to connect directly to the bus of a host computer. USB host interface 916 communicates with USB device controller 806 using the USB protocol. Clock generator and DLLs 918 generate clocks and provide DLLs used to dynamically update software being executed by MAC block 808.

Figure 10:
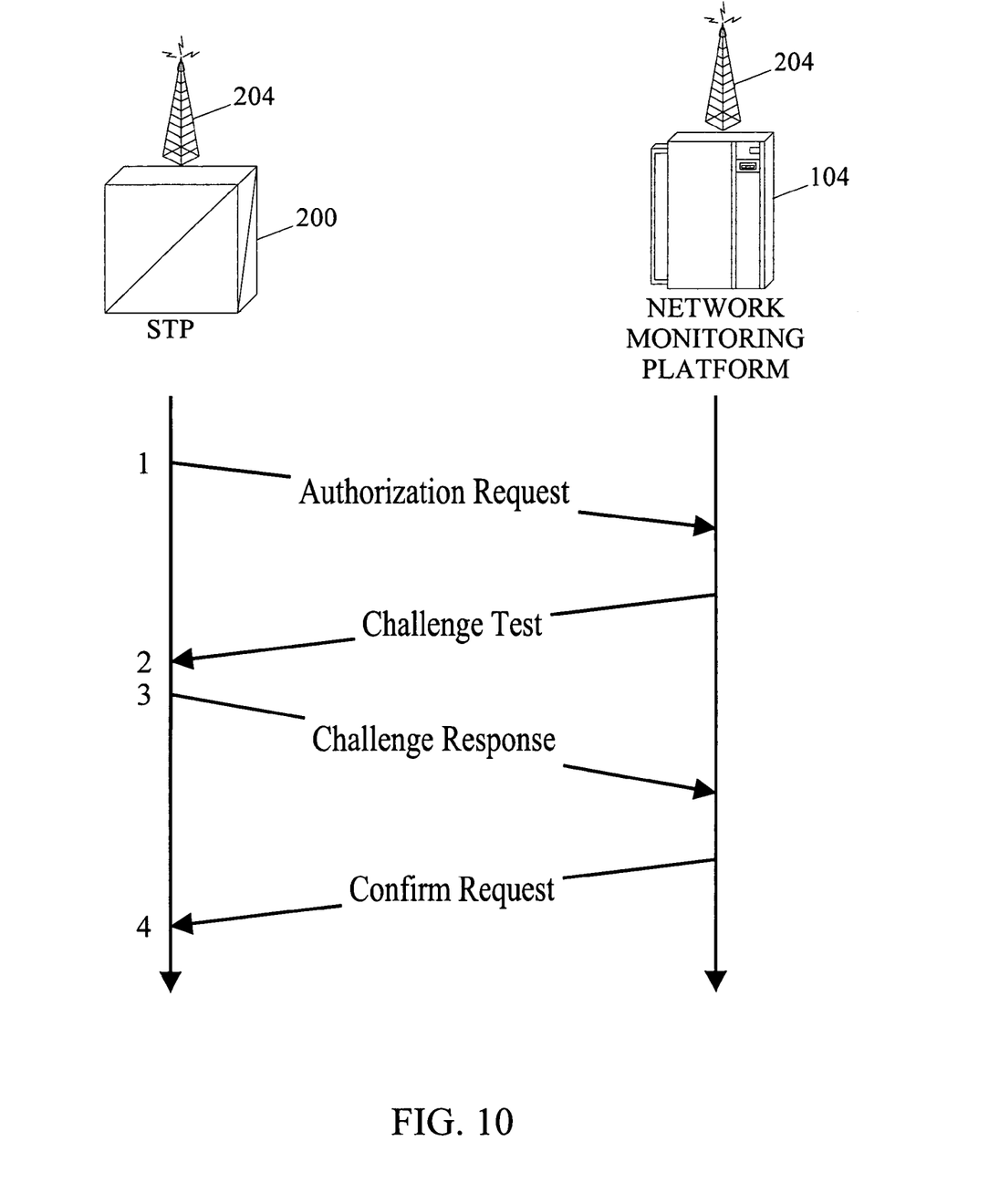
FIG. 10 is a message flow diagram illustrating an exemplary authentication sequence suitable for use with embodiments of the present invention.

According to an important aspect of the invention, signaling message copies sent over the WLAN interface are preferably sent in a secure manner. As illustrated in FIG. 9, one security feature provided by the 802.11 family of protocols is the WEP protocol. FIG. 10 is a message flow diagram illustrating an exemplary authentication sequence that may be performed by one of the WLAN interfaces in STP 200 and a corresponding interface in platform 104 according to an embodiment of the present invention. Referring to FIG. 10, a WLAN interface of STP 200 requests 802.11 service by sending an authentication frame to a corresponding interface in network monitoring platform 104. In line 2 of the message flow diagram, when the WLAN interface in network monitoring platform 104 receives the authentication frame, the interface replies with an authentication frame including challenge information. In line 3 of the message flow diagram, the requesting WLAN interface in STP 200 encrypts the text in the challenge frame with a shared key using the WEP service and sends the frame to the corresponding transceiver in network monitoring platform 104. In line 4 of the message flow diagram, the WLAN interface of platform 104 decrypts the text using the same shared key and compares it to the challenge text sent earlier. If the text matches, the WLAN interface of platform 104 replies with the authentication acknowledgement. If not, a negative acknowledgement may be sent.

Once the authentication sequence in FIG. 10 is complete, secure communications between the WLAN interfaces in STP 200 and in network monitoring platform 104 can occur. For example, because authentication is required, the likelihood of successful masquerading is reduced. In addition, messages can be encrypted using the RC4 algorithm and a shared encrypted key. Secure communications may be important because signaling message copies may include information that can be used to threaten the security of the signaling network. In addition, signaling messages include billing information that could be intercepted or falsified.

Figure 11:
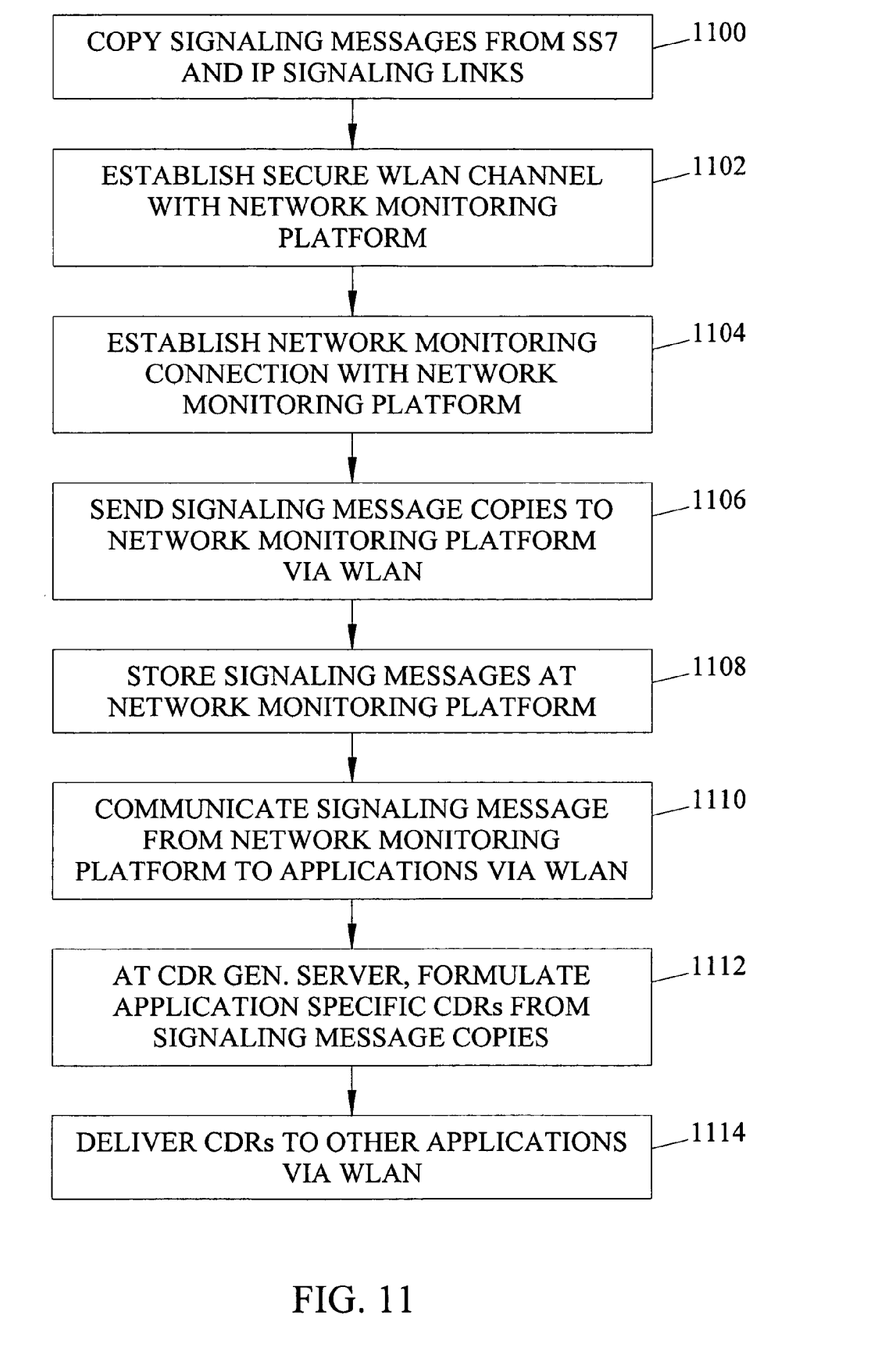
FIG. 11 is a flow chart illustrating exemplary steps for communicating copied signaling messages from a signal transfer point to a network monitoring application via a WLAN according to an embodiment of the present invention.

FIG. 11 is a flow chart illustrating exemplary overall steps performed by a WLAN-based network monitoring system according to an embodiment of the present invention. Referring to FIG. 11, in step 1100, signaling messages are copied from SS7 and IP signaling links. This step may be performed by message copy functions 102 located on the LIM and DCM cards illustrated in FIG. 3. In addition, or alternatively, this function may be performed by network monitoring shelf 212 illustrated in FIG. 2. In step 1102, secure WLAN channels are established with network monitoring platform 104. This step may involve exchanging the WEP authentication messages illustrated in FIG. 10.

In step 1104, a network monitoring connection is established with a network monitoring platform. This step may be performed by message copy functions 102 and network monitoring connection managers 412 illustrated in FIGS. 4-6. More particularly, message copy functions 102 may send network monitoring service request messages over the protocol stack implemented by network monitoring connection managers 412. Network monitoring processors located on network monitoring platform 104 may respond to the service request by accepting the connection. Once a connection is accepted, the message copy functions may send signaling message copies to the network monitoring platform via the WLAN, as indicated by step 1106.

In step 1108, network monitoring platform 104 stores signaling message copies. In step 1110, network monitoring platform 104 distributes signaling message copies to network monitoring applications via the WLAN. This step may be performed by establishing secure connections with the network monitoring applications. In one implementation, network monitoring platform 104 may deliver the message copies to CDR generation server 108. CDR generation server 108 may generate application specific CDRs from the signaling message copies (step 1112). In step 1114, CDR generation server may distribute the application specific CDRs to the various applications via the WLAN.

Although in the examples described above, signaling message copies are distributed among the various nodes of the network monitoring system illustrated in FIG. 2, the present invention is not limited to sending entire message copies via the WLAN. In an alternate implementation, signaling message parameters that are of interest to the various network monitoring applications may be transmitted among the various network monitoring nodes illustrated in FIG. 2. Thus, transmitting all or part of the signaling messages via a WLAN is intended to be within the scope of the invention.

Thus, the present invention includes methods and systems for communicating signaling message copies to network monitoring applications via a WLAN. Because a WLAN is used, network monitoring platforms can be more easily installed in existing telecommunications signaling sites. In addition, in one exemplary implementation, WLAN interfaces are located on the link interface modules. Such an implementation provides increases scalability over conventional network monitoring applications where a single NIC controlled network monitoring communications for a plurality of link interface modules.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for monitoring signaling message traffic in a telecommunications network, the method comprising:
    (a) receiving a signaling message at a network routing node;
    (b) generating a copy at least a portion of the signaling message;
    (c) transmitting the copy to a network monitoring platform via a wireless communication link using a wireless local area network (WLAN) protocol; and
    (d) routing the received signaling message to a signaling node via a wireline signaling link.

2. The method of claim 1 wherein receiving the signaling message includes receiving the signaling message at a signaling link interface module located in the routing node.

3. The method of claim 2 wherein generating the copy includes generating the message copy on the signaling link interface module.

4. The method of claim 3 wherein transmitting the copy includes transmitting the message copy using a WLAN interface located on the signaling link interface module.

5. The method of claim 2 wherein transmitting the copy includes transmitting the message copy using a WLAN interface separate from the signaling link interface module.

6. The method of claim 1 generating the copy includes using link probes and a shelf external to the network routing node.

7. The method of claim 6 wherein transmitting the copy to the network monitoring platform includes transmitting the copy to the network monitoring platform using a WLAN interface located on the network monitoring shelf.

8. The method of claim 1 wherein transmitting the copy to the network monitoring platform includes forwarding the copy to a WLAN router/access point and wherein the WLAN router/access point forwards the copy to the network monitoring platform.

9. The method of claim 1 wherein transmitting the copy to the network monitoring platform includes establishing a secure connection with the network monitoring platform prior to transmitting the copy via the WLAN.

10. The method of claim 9 wherein establishing the secure connection includes performing an authentication sequence with the network monitoring platform.

11. The method of claim 9 wherein establishing the secure connection includes encrypting the message copied prior to sending the message copy over the WLAN.

12. The method of claim 1 wherein performing steps (a)-(c) includes performing steps (a)-(c) at a signal transfer point.

13. The method of claim 1 wherein the WLAN protocol includes an 802.11x protocol.

14. The method of claim 1 wherein the WLAN protocol includes at least one 802.16 protocol layer.

15. The method of claim 1 wherein the WLAN protocol includes at least one 802.20 protocol layer.

16. The method of claim 1 including transmitting the copy from the network monitoring platform to a network monitoring application.

17. The method of claim 16 wherein transmitting the copy from the network monitoring platform to the network monitoring application includes transmitting the copy via the WLAN.

18. The method of claim 1 wherein the signaling message comprises an SS7 signaling message.

19. A system for monitoring signaling message traffic in a telecommunications network, the system comprising:
(a) a network node for receiving a signaling message and routing the received signaling message to a signaling node via a wireline signaling link, the network node including a message copy function for copying at least a portion of the received signaling message and a first wireless local area network (WLAN) interface for transmitting the copy using a WLAN protocol; and
(b) a network monitoring platform operatively associated with the network node and including a second WLAN interface for receiving the copy and memory for storing the copy transmitted by the network node.

20. The system of claim 19 wherein the network node comprises a signal transfer point including a link interface module, wherein the message copy function is located on the link interface module.

21. The system of claim 20 wherein the first WLAN interface is located on the link interface module for transmitting messages copied by the link interface module.

22. The system of claim 20 wherein the signal transfer point includes a network monitoring transport card for receiving messages copied by the message copy function and wherein the first WLAN interface is located on the network monitoring transport card.

23. The system of claim 19 wherein the network monitoring platform includes an access point and wherein the second WLAN interface is associated with the access point.

24. The system of claim 19 wherein the WLAN protocol includes an 802.11x protocol layer.

25. The system of claim 19 wherein the WLAN protocol includes at least one 802.16 protocol layer.

26. The system of claim 19 wherein the wireless LAN protocol includes at least one 802.20 protocol layer.

27. The system of claim 19 wherein the network node comprises a network monitoring shelf for copying signaling messages from signaling links external to a network routing node.

28. The system of claim 19 wherein the first and second WLAN interfaces are adapted to perform an authentication sequence prior to transmission of the message copy.

29. The system of claim 19 wherein the first WLAN interface is adapted to encrypt the copy prior to sending a message copy to the second WLAN interface.

30. The system of claim 19 wherein the signaling message comprises an SS7 signaling message.

31. A network routing node for monitoring signaling message traffic in a telecommunications network, the network routing node comprising:
(a) a signaling link interface module for receiving a signaling message;
(b) a message copy function operatively associated with the signaling link interface module for creating a copy of at least a portion of the received signaling message; and
(c) a WLAN interface operatively associated with the signaling link interface module for transmitting the copy to an external receiver using a WLAN protocol,
wherein the network routing node routes the received signaling message to a signaling node via a wireline signaling link.

32. The network routing node of claim 31 wherein the signaling link interface module, the message copy function, and the WLAN interface are components of a signal transfer point.

33. The network routing node of claim 31 wherein the WLAN interface comprises an 802.11x interface.

34. The network routing node of claim 31 wherein the WLAN interface comprise an 802.16 interface.

35. The network routing node of claim 31 wherein the WLAN interface comprises an 802.20 interface.

36. The network routing node of claim 31 wherein the message copy function resides on the signaling link interface module.

37. The network routing node of claim 36 wherein the WLAN interface resides on the signaling link interface module.

38. The network routing node of claim 36 comprising a network monitoring transport card operatively associated with the signaling link interface module, wherein the WLAN interface resides on the network monitoring transport card and is adapted to receive the copy from the message copy function.

39. The network routing node of claim 31 wherein the signaling message comprises an SS7 signaling message.

40. A system for monitoring signaling message traffic in a telecommunications network, the system comprising:
(a) a network node for receiving a signaling message and routing the received signaling message to a signaling node via a wireline signaling link, the network node including a message copy function for copying at least a portion of a received signaling message and a wireless local area network (WLAN) interface for transmitting the copy using a WLAN protocol;

(b) a wireless router/access point having a WLAN interface and a wired LAN interface, wherein the WLAN interface is adapted to receive the message copy from a wireless LAN and the wired LAN interface is adapted to transmit the message copy over a wired LAN; and (c) a network monitoring platform for receiving the message copy from the wireless router/access point via the wired LAN.

41. A network routing node for monitoring signaling message traffic in a telecommunications network, the network routing node comprising:

(a) a plurality of signaling link interface modules for sending and receiving signaling messages;

(b) a plurality of message copy functions operatively associated with the signaling link interface modules for copying signaling messages sent or received by the signaling link interface modules; and (c) a plurality of WLAN interfaces, each WLAN interface being associated with one of the signaling link interface modules for transmitting messages copied by the message copy functions to an external receiver using a WLAN protocol, wherein the network routing node routes the received signaling messages to signaling nodes via wireline signaling links.

* * * * *